United States Patent
Ueda (10) Patent No.: US 7,167,822 B2
(45) Date of Patent: Jan. 23, 2007

(54) SYSTEM FROM PREPARING LANGUAGE LEARNING MATERIALS TO TEACHING LANGUAGE, AND LANGUAGE TEACHING SYSTEM

(75) Inventor: Sanae Ueda, Musashino (JP)

(73) Assignee: Lets International, Inc., Tokyo (JP)

( * ) Notice: Subject to any disclaimer, the term of this patent is extended or adjusted under 35 U.S.C. 154(b) by 1108 days.

(21) Appl. No.: 10/137,588

(22) Filed: May 2, 2002

(65) Prior Publication Data

US 2003/0208353 A1    Nov. 6, 2003

(51) Int. Cl.
    *G06F 17/28*    (2006.01)

(52) U.S. Cl. .................. 704/7; 434/169; 434/157; 434/156

(58) Field of Classification Search .............. 704/7, 704/9, 10, 1, 2, 4–6, 251, 257, 270, 277; 434/350, 118, 169, 157

See application file for complete search history.

(56) References Cited

U.S. PATENT DOCUMENTS 6,160,987 A * 12/2000 Ho et al. ............... 434/350

* cited by examiner

*Primary Examiner*—Richemond Dorvil
*Assistant Examiner*—Huyen X. Vo
(74) *Attorney, Agent, or Firm*—Price, Heneveld, Cooper, DeWitt & Litton, LLP (57) ABSTRACT

Learning materials of an Ueda Method can be distributed to teachers and learners through a computer network, and a teacher can effectively teach a language using the distributed learning materials of the Ueda Method. The method includes: (A) inputting to a computer predetermined information about our daily life which refers to an advertisement of a company; (B) preparing language learning materials for a learner and language teaching materials for a teacher based on the advertisement; (C) distributing the language learning materials to the learner through a network; (D) distributing to a teacher the language learning materials and the language teaching materials through a network; (E) training a teacher using the language learning materials and the language teaching materials; (F) inputting and registering the trained teacher and a learner in the computer; and (G) the trained teacher teaching a language to a learner through the computer.

7 Claims, 6 Drawing Sheets

SYSTEM FROM PREPARING LANGUAGE LEARNING MATERIALS TO TEACHING LANGUAGE, AND LANGUAGE TEACHING SYSTEM

BACKGROUND OF THE INVENTION

1. Field of the Invention

The present invention relates to a system from preparing language learning materials using a computer to teaching a language, and a system of teaching a language using a computer.

2. Description of the Prior Art

The conventional language learning method refers to teaching a learner a language by a teacher based on language learning materials prepared as a form of a book, learning a language by a learner himself or herself through a language program on television using learning materials prepared for the program, learning a language by a learner himself or herself using a video for learning a language and learning materials for the video, or teaching a learner a language by a teacher using the TV program or the video based on the learning materials prepared for the TV program or the video.

These language learning materials have been prepared based on the fields of applications for overseas travels, four seasons, business, children, housewives, etc.

BRIEF SUMMARY OF THE INVENTION

Object of the Invention

Since the above mentioned learning materials have been prepared based on each field such as the application for overseas travels etc., it has been difficult to learn a language used in our daily life.

As a result, to solve the problem, the applicant of the present invention has invented appropriate language learning materials based on our daily life, and filed it to the Patent Office on Dec. 6, 2000 (Japanese Patent Application No. 2000-371819).

The language learning materials described in Japanese Patent Application No. 2000-371819 are not limited to the conventional method of learning a language using a textbook alone, a TV program and its textbook or a video and its textbooks but also refer to a method of learning and teaching a language using a computer by inputting learning materials to the computer.

Japanese Patent Application No. 2000-371819 discloses language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. The language learning materials are referred to as an Ueda Method, and are unique language learning materials.

The present invention obtains from a company predetermined information used for the learning materials in the Ueda Method through a network of a computer by inputting the learning materials of the Ueda Method to the computer, distributes the learning materials of the Ueda Method to a teacher and a learner through the network, and teaches a learner by a teacher a language using the distributed learning materials in the Ueda Method.

SUMMARY OF THE INVENTION

To attain the above mentioned purpose, the system from preparing language learning materials to teaching a language shows in language learning materials, including:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by the picture, the symbol, and/or the photo in a foreign language to be learned; and language teaching materials for a teacher in a foreign language represented by preparing each word, predetermined types of sentence, and sentences in the foreign language to be taught to a learner, a system from preparing language materials to teaching a language comprises the steps of:

(A) a language learning materials preparing company inputting to a computer the predetermined information selected from the information about our daily life which refers to an advertisement of a company;

(B) the language learning materials preparing company preparing using the computer the language learning materials for a learner and the language teaching materials for a teacher based on the advertisement;

(C) distributing the language learning materials for a learner to the learner through a network;

(D) distributing to a teacher the language learning materials for a learner and the language teaching materials for a teacher through a network or through commonly available means;

(E) training a teacher using the language learning materials for a learner and the language teaching materials for a teacher;

(F) inputting and registering the trained teacher and a learner in the computer; and (G) the trained teacher teaching a language to a learner through the computer using the language learning materials for a learner and the language teaching materials for a teacher.

It is desired that the above mentioned advertisement of a company is an advertisement actually shown on television by the company.

It is desired that the advertisement of a company is to be changed after a predetermined time lapse.

It is desired that the information refers to instructions of a product and/or company information for which an advertisement of a company is shown on television.

It is desired that when the advertisement of the company is input to the computer, a charge for the advertisement shown on language learning materials can be collected from the company of the advertisement.

It is desired that the learning materials for a learner are to be provided for the learner free of charge, and the learner is registered free of charge.

It is desired that the teacher is charged for training, and the trained teacher is either registered free of charge or charged for registration.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer; and (B) the teacher teaching the learner the language to be learned by the learner based on the language learning materials input to the computer using words, the types of sentences, and the sentences in the language through the computer.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer;

(B) the teacher having the learner listen through the computer to the teacher speaking at a moderate speed a sentence input to the computer in the language to be learned by the learner;

(C) the teacher having the learner listen through the computer to the teacher speaking at a low speed a sentence input to the computer in the language to be learned by the learner;

(D) the teacher having the learner listen through the computer to the teacher speaking at a moderate or low speed a sentence input to the computer in the language to be learned by the learner with the sentence segmented; and (E) the teacher finally having the learner listen again through the computer to the teacher speaking at a moderate speed a sentence input to the computer in the language to be learned by the learner.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer;

(B) the teacher having the learner listen through the computer to the teacher speaking at a moderate speed a sentence input to the computer in the language to be learned by the learner;

(C) the teacher having the learner listen through the computer to the teacher speaking at a low speed a sentence input to the computer in the language to be learned by the learner;

(D) the teacher having the learner listen through the computer to the teacher speaking at a moderate or low speed a sentence input to the computer in the language to be learned by the learner with the sentence segmented;

(E) the teacher having the learner listen through the computer to the teacher speaking at a moderate speed a sentence input to the computer in the language to be learned by the learner; and (F) the teacher finally having the learner finally listen through the computer to the teacher speaking at a speed a little faster than the moderate speed a sentence input to the computer in the language to be learned by the learner.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer;

(B) the teacher having the learner listen through the computer to the teacher speaking at a moderate speed a sentence input to the computer in the language to be learned by the learner;

(C) the teacher having the learner listen through the computer to the teacher speaking at a low speed a sentence input to the computer in the language to be learned by the learner;

(D) the teacher having the learner listen through the computer to the teacher speaking at a moderate or low speed a sentence input to the computer in the language to be learned by the learner with the sentence segmented;

(E) the teacher having the learner listen through the computer to the teacher speaking at a moderate speed a sentence input to the computer in the language to be learned by the learner;

(F) the teacher having the learner listen to BGM and effective sound input to the computer;

(G) the learner inserting narration while providing BGM and effective sound input to the computer, and simultaneously outputting the BGM and the effective sound, and the teacher having the learner listen to the teacher speaking; and (H) the teacher finally having the learner listen again through the computer to the teacher speaking at a moderate speed a sentence input to the computer in the language to be learned by the learner.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer;

(B) the teacher having the learner listen through the computer to the teacher speaking at a moderate speed a sentence input to the computer in the language to be learned by the learner;

(C) the teacher having the learner listen through the computer to the teacher speaking at a low speed a sentence input to the computer in the language to be learned by the learner;

(D) the teacher having the learner listen through the computer to the teacher speaking at a moderate or low speed a sentence input to the computer in the language to be learned by the learner with the sentence segmented;

(E) the teacher having the learner listen through the computer to the teacher speaking at a moderate speed a sentence input to the computer in the language to be learned by the learner;

(F) the teacher having the learner listen through the computer to the teacher speaking at a speed a little faster than the moderate speed a sentence input to the computer in the language to be learned by the learner;

(G) the teacher having the learner listen to BGM and effective sound input to the computer;

(H) the learner inserting narration while providing BGM and effective sound input to the computer, and simultaneously outputting the BGM and the effective sound, and the teacher having the learner listen to the teacher speaking; and (I) the teacher finally having the learner listen again through the computer to the teacher speaking at a moderate speed a sentence input to the computer in the language to be learned by the learner.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer;

(B) the learners inputting to the computer a sentence newly written in the language to be learned by the learner according to the predetermined information; and (C) the teacher correcting the new sentence written and input to the computer in the language to be learned by the learner.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer;

(B) the learners inputting to the computer a sentence newly written in the language to be learned by the learner according to the predetermined information;

(C) the teacher correcting the new sentence written and input to the computer in the language to be learned by the learner; and (D) the teacher having said learner listen to narration prepared by the learner based on the new sentence written and input to the computer in the language to be learned by the learner by inputting the narration to the computer while simultaneously outputting BGM and effective sound input to the computer.

It is desired that using a network, an opinion about a product shown in the advertisement of a company is transmitted to the company through the sentence newly written in the language to be learned by the learner and input to the computer and the narration prepared by the learner according to the information.

It is desired that the information system refers to a TV commercial.

The teaching system according to the present invention shows language learning materials, comprising:

predetermined information selected from the information about our daily life;

predetermined types of sentences based on the sentences described in the information, the sentences produced by amending the sentences described in the information, or the sentences produced according to the information;

language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by a picture, a symbol, and/or a photo in a foreign language to be learned; and language teaching materials for a teacher in a foreign language represented by preparing each word, predetermined types of sentence, and sentences in the foreign language to be taught to a learner. Using the language learning materials, the system performs the process comprising the steps of:

(A) inputting the language learning materials to a computer; and (B) the teacher having the learner reading the sentence written in the language to be learned by the learner and input to the computer, and the predetermined information.

It is desired that the sentence represented in a language to be learned by a learner and input to the computer is a sentence obtained by a learning material preparing company or the teacher amending a sentence described in the information, or a sentence written by the learner according to the information.

It is also desired that the information refers to the advertisement of a company or instructions of a product and/or information about the company shown in the advertisement of the company.

The language learning materials in the Ueda Method is featured by learning a language by representing a sentence by pictures, symbols, and/or photos. The present invention is featured by a system of inputting the language learning materials to a computer, and preparing the language learning materials by connecting a company, a teacher, and a learner through the network of a computer, thereby realizing a teaching system.

The predetermined information can be any piece of information relating to our daily life such as newspaper advertisements, TV commercials, etc. Since learners are familiar with the advertisements of companies, they can be practical and effective language learning materials.

Therefore, the predetermined information can be practical language learning materials by changing the information after a predetermined time lapse.

Since the management of a language teaching company can collect charges for an advertisement of a company shown on the language learning materials, for training a teacher, and registering a teacher, the learners can be provided with the language learning materials free of charge, thereby easily finding new learners.

When an advertisement of a company is input to a computer, a product of the company can be effectively advertised to the teachers and learners by inputting not only the advertisement but also the instructions of the product and the company information, thereby easily collecting the charge for the advertisement from the company.

Since teachers and learners are registered, it is easily informed that how many teachers and learners have been registered, thereby quickly informing a company of the registration record through a network, and easily collecting the charge for an advertisement from the company.

A teacher can effectively teach a language to learners by inputting the language learning materials of the Ueda Method to a computer, teaching a word, types of sentences, and sentences of a language through a computer, having the learners listen, and having them prepare and speak narration.

DETAILED DESCRIPTION OF THE PREFERRED EMBODIMENTS

An example of an embodiment of the present invention will be described below by referring to the attached drawings.

Figure 1:
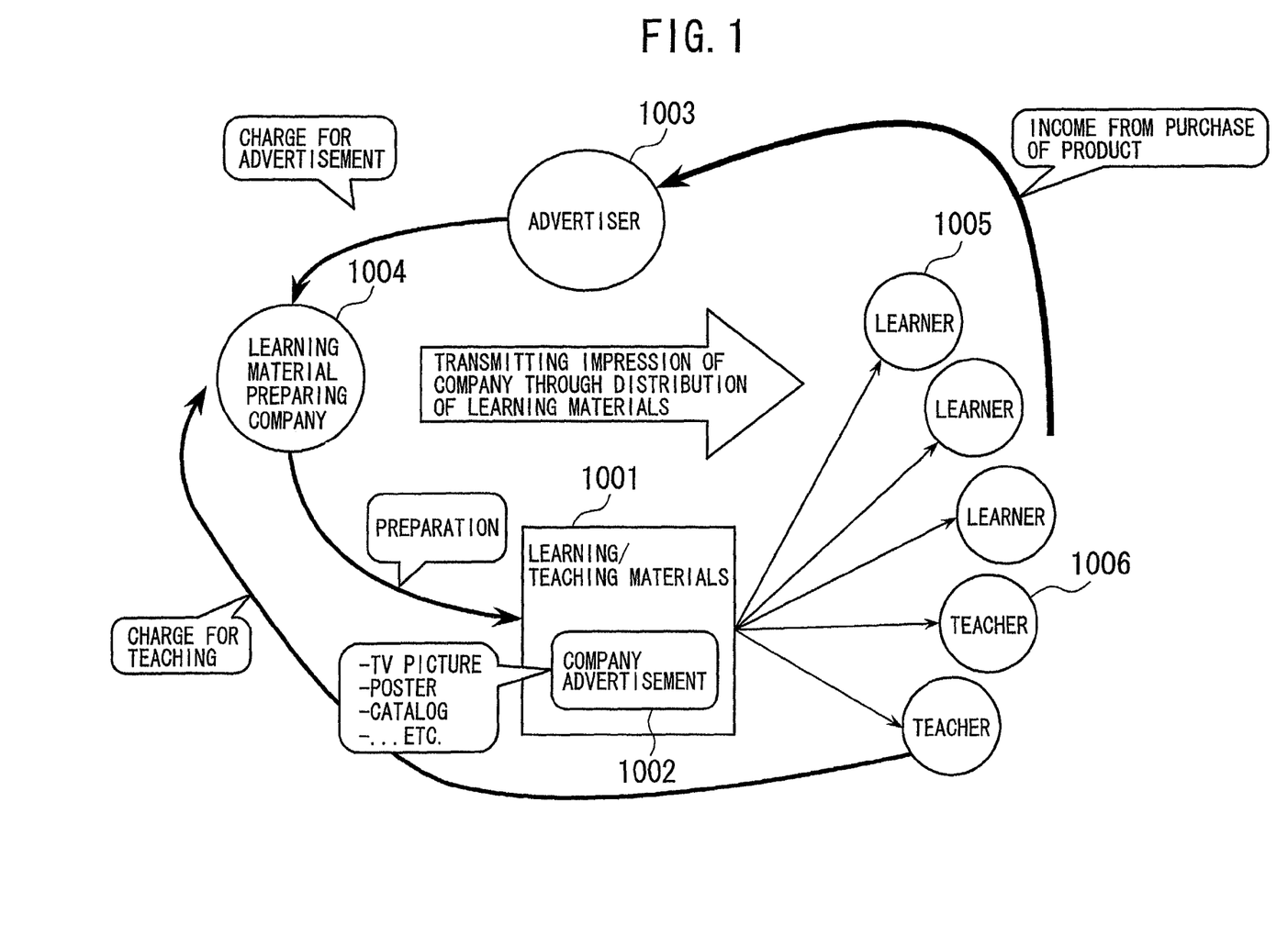
FIG. 1 shows a system of using an advertisement of a company as language learning materials, obtaining an income from the advertisement, and distributing the language learning materials.

FIG. 1 shows a system of using an advertisement of a company as language learning materials, obtaining an income from the advertisement, and distributing language learning materials.

A company propaganda (advertisement) 1002 such as a TV picture (a TV commercial etc.), a poster, a catalog, etc., instructions of a product (not shown in the attached drawings), company information etc. are contained in the language learning materials of the Ueda Method, that is, learning/teaching materials 1001, and are input to a computer such as a personal computer or the like. The learning/teaching materials 1001 are prepared by a learning material preparing company 1004.

The learning material preparing company 1004 prepares the learning/teaching materials 1001, and distributes them to a learner 1005 and a teacher 1006. The learning/teaching materials 1001 are provided for the learner 1005 free of charge. By providing the learning materials for learners free of charge, it becomes easier to find new learners 1005. The learning materials can be distributed through a computer network of personal computers etc. The language teaching materials for teachers can be distributed in the method normally used in training teachers. That is, they can be distributed to teachers by mail, or directly presented to them.

The learning material preparing company 1004 collects a predetermined charge for training from the teacher 1006.

Using the language learning materials of the Ueda Method, that is, using the learning/teaching materials 1001, the learner 1005 and the teacher 1006 can see the product advertised in the advertisement of a company, and also the instructions of the product, company information, etc. Therefore, the company can expect to advertise the company itself, and expect them to buy the product. As a result, the company, that is, the advertiser 1003, can obtain an income in this method.

The advertisement of the company is changed after a predetermined time lapse, that is, for each season, or when a new advertisement is prepared by the company. Therefore, the learners can learn the language from familiar information, thereby successfully learning a language related to our daily life.

Figure 2:
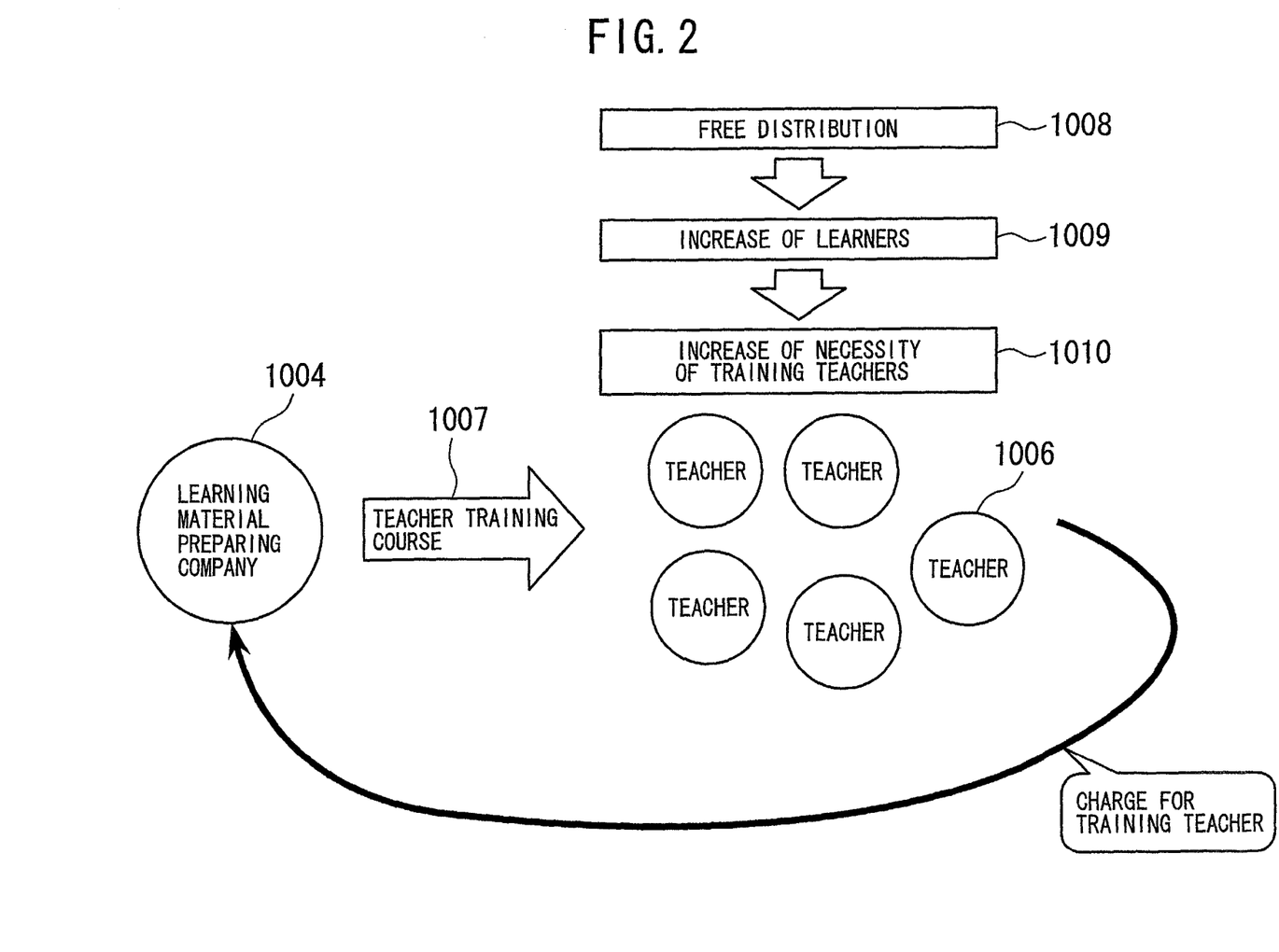
FIG. 2 shows a system of collecting charge for training a teacher, and freely distributing learning materials.

FIG. 2 shows a system of collecting charge for training a teacher, and freely distributing learning materials 1001.

A learning material preparing company trains the teacher 1006 in a teacher training course 1007, and collects the charge for training the teacher from the teacher 1006.

The learning/teaching materials 1001 invite an increase 1009 of learners 1005 through free distribution 1008. Since the number of learners 1005 increases, the number of teachers 1006 necessarily increases 1010.

Figure 3:
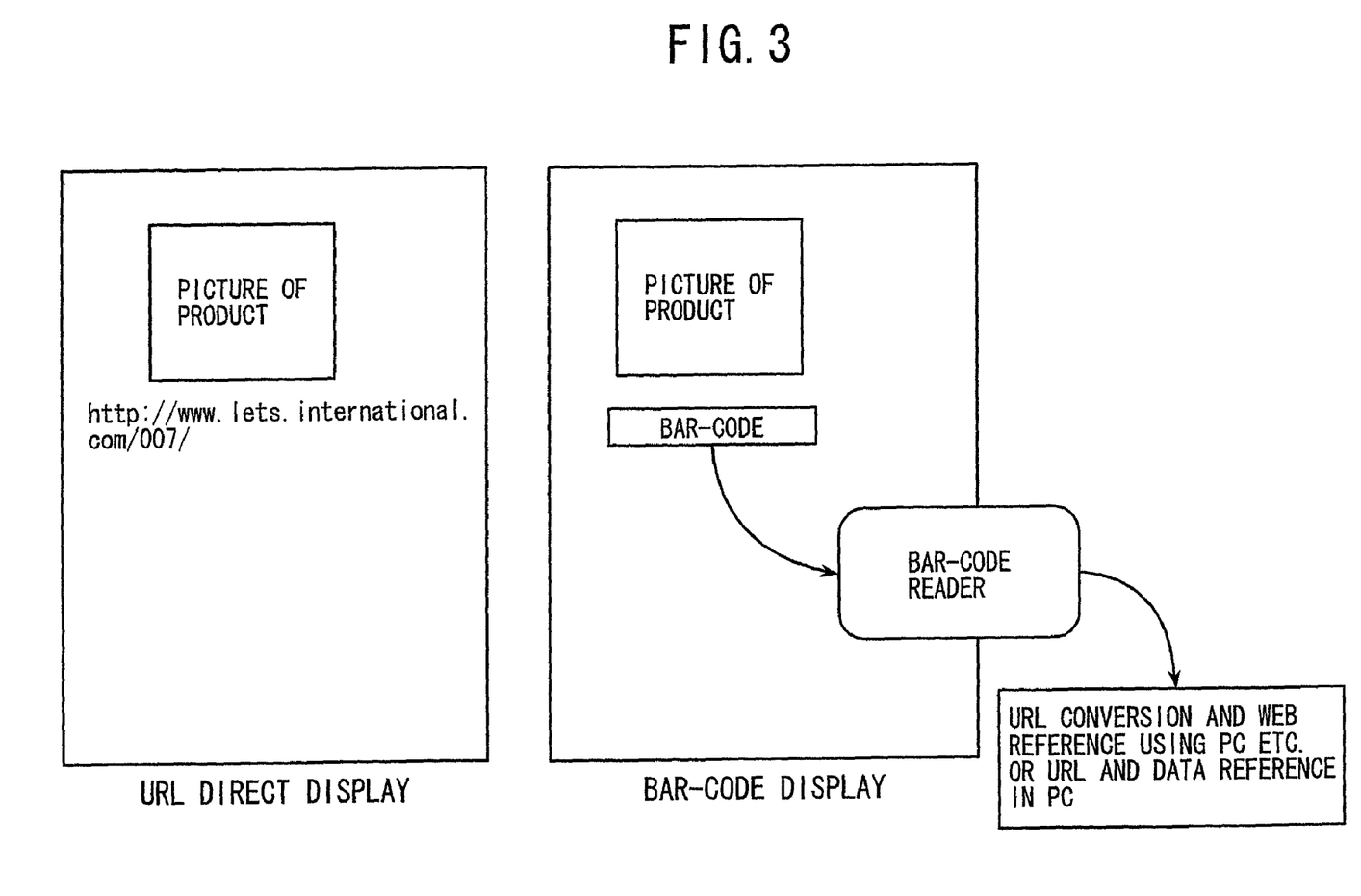
FIG. 3 shows a system of establishing a link to data such as instructions on a display of a product.

FIG. 3 shows a system of establishing a link to database such as instructions on the display of a product.

The link address of Internet to a corresponding product is indicated in the language learning materials of the Ueda Method, that is, the learning/teaching materials 1001. When the contents are displayed as a Web page, the product is associated with its link address of Internet. Among the products of the company appearing in the language learning materials, the link addresses of Internet are associated. The link address can be a URL (uniform resource locator) directly displayed on the screen, but it can also be displayed using a bar-code etc., the bar-code can be obtained using a bar-code reader, and the bar-code is input to a computer such as a personal computer etc. A personal computer etc. has a URL table corresponding to the bar-code etc., converts the bar-code etc. into the URL, and displays a target URL using the Web browser etc.

When a network is not available, a set of data for display of the bar-code etc. is prepared as a table, and the data corresponding to the bar-code etc. is obtained from the bar-code for display.

Thus, the company can furthermore improve the effect of the advertisement.

Figure 4:
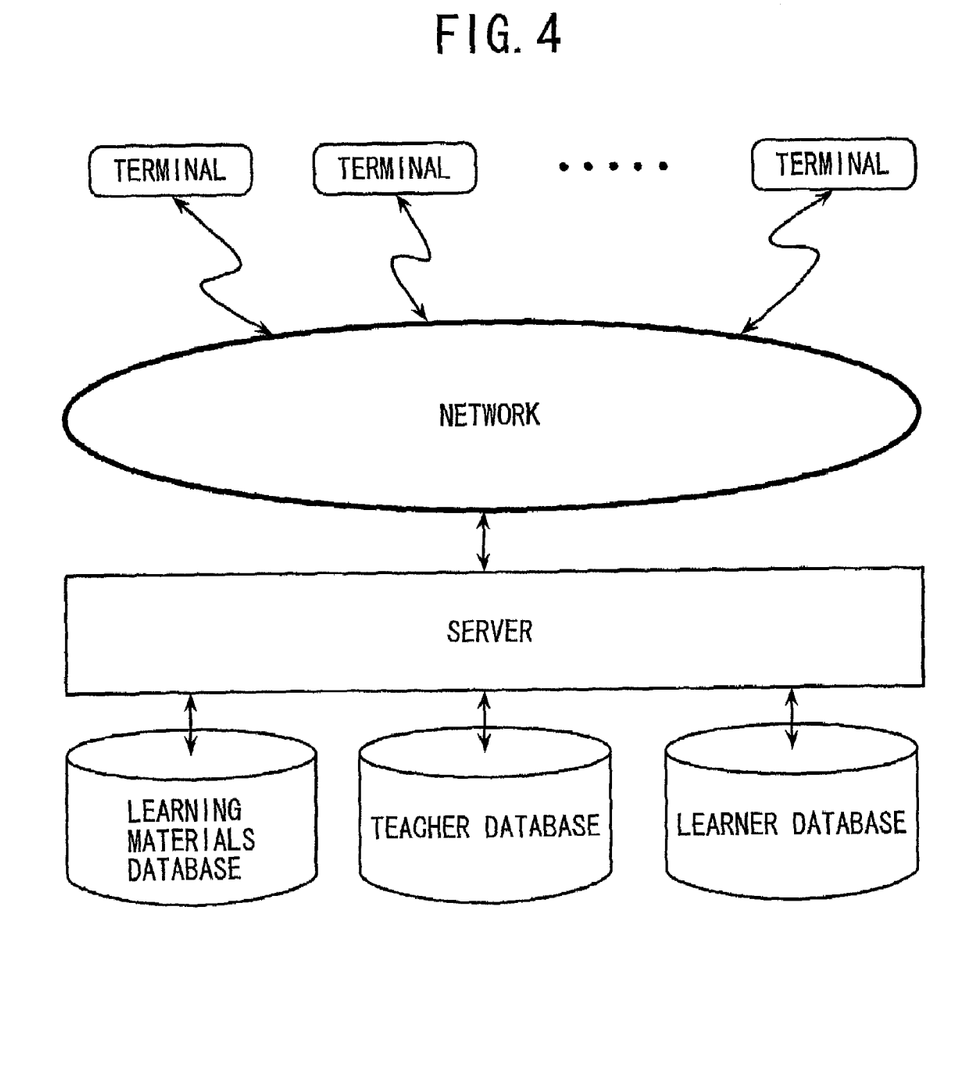
FIG. 4 shows a system of distributing the learning materials using a network as a medium.

FIG. 4 shows a system of distributing learning materials using a network as a medium.

The server, that is, the learning material preparing company 1004 accumulates the language learning materials of the Ueda Method, registers the learner 1005 and the teacher 1006, and manages the database of the learner 1005 and the teacher 1006.

The teacher 1006 can check the progress of the learner 1005. The learner 1005 and the teacher 1006 can have an instruction as to what subject is required for the learner 1005 to realize the conversation at a target level. The teacher 1006 can select and combine the functions, situations, grammar, sentence types, words required for the learner 1005.

Thus, the language learning/teaching materials 1001 of the Ueda Method are input to a computer, and the teacher 1006 can teach the learner 1005 the words, the sentence types, and the sentences in the language to be learned by the learner 1005 using the computer.

A company can check the actual number of the teachers 1006 and the learners 1005 in the home country and overseas through the registration of the learners and the teachers. Since the present invention relates to the learning of a language, the learning/teaching materials 1001 of the Ueda Method can be used in the home country and overseas.

Figure 5:
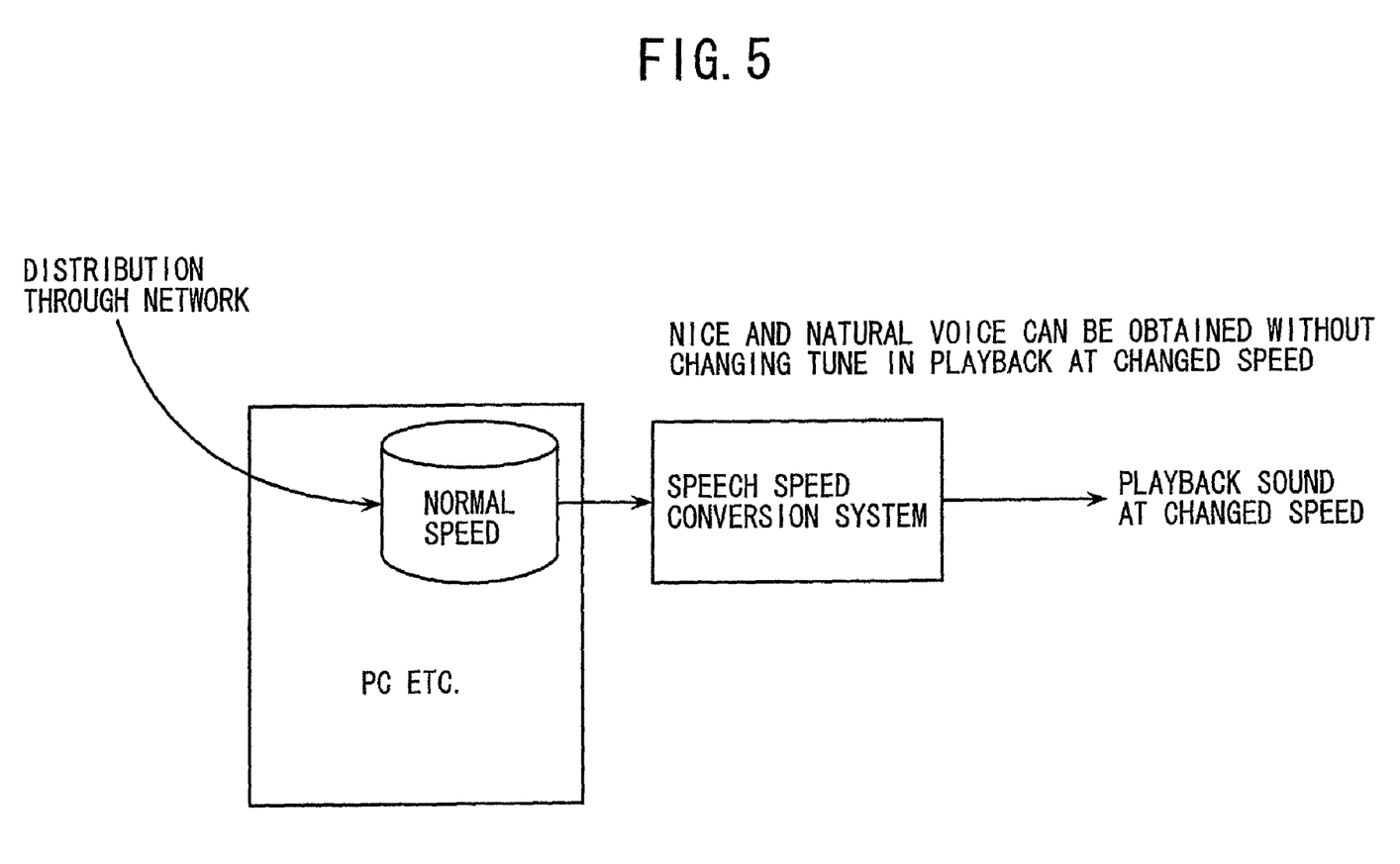
FIG. 5 shows a method of keeping tune correctly, completely or to some extent.
Figure 6:
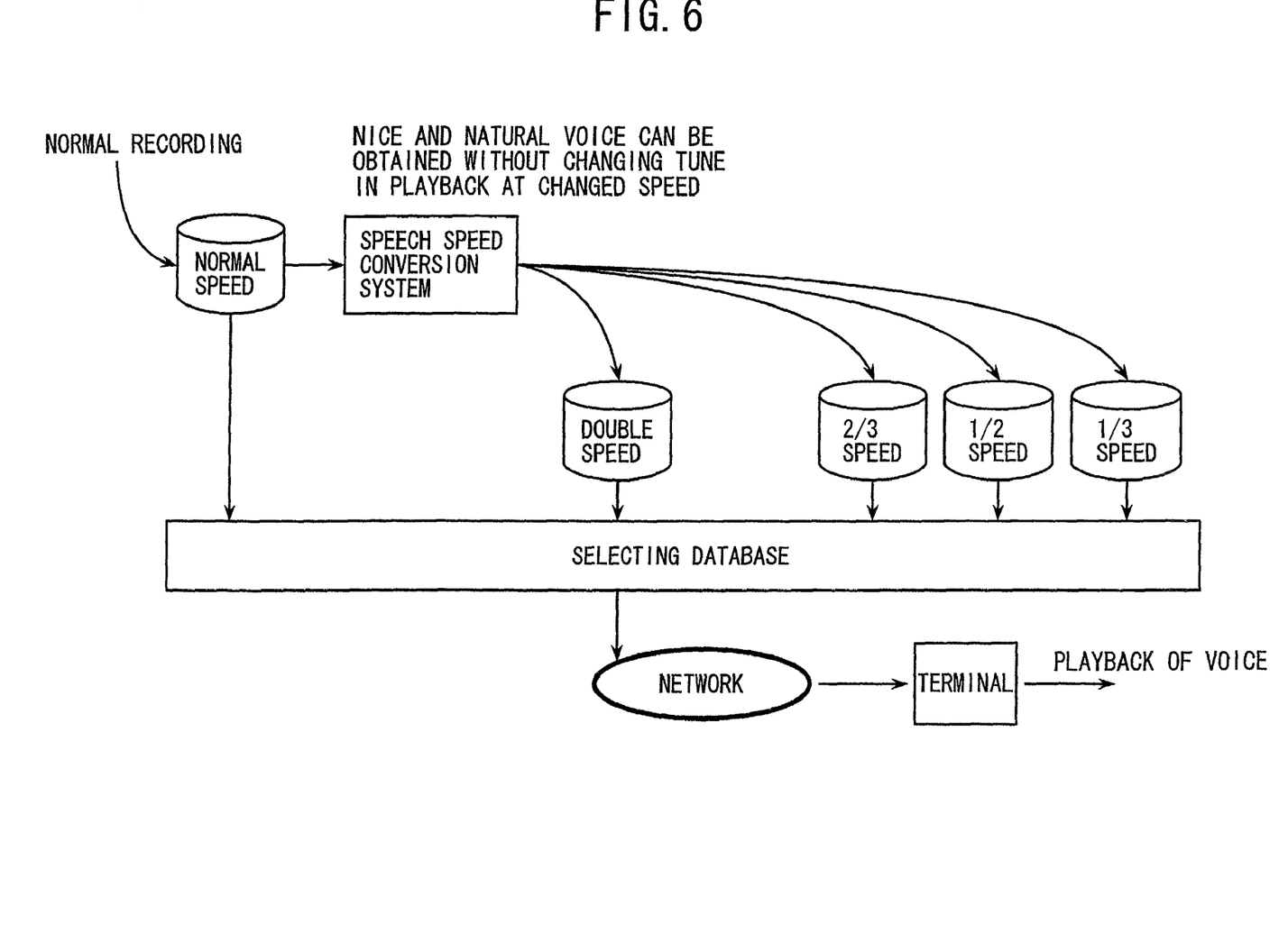
FIG. 6 shows a method of keeping tune correctly, completely or to some extent.

FIGS. 5 and 6 show a method of correctly, completely or to some extent, keeping tune. FIG. 5 shows the conversion of the speed of speech on the terminal side. FIG. 6 shows the conversion on the server without an adapter on the terminal side.

The language learning/teaching materials 1001 of the Ueda Method are input to a computer such as a personal computer etc., and the teacher 1006 teaches the learner 1005 the words, the sentence types, and the sentences in the language to be learned by the learner using the computer by having the learner 1005 listen to speech in the language (hearing lesson). The process of the hearing lesson comprises the first step of hearing speech at a moderate speed, the second step of hearing speech at a low speed, the third step of dividing a sentence into segments and hearing them at a moderate speed and then at a low speed, and the fourth step of hearing speech at a moderate speed. In addition, as the fifth step, the teacher has an advanced learner or a diligent learner listen to the speech at a speed a little higher than the moderate speed.

In another first step of hearing speech, the learner can hear the BGM and the effective sound input to the computer, and the learner 1005 can input narration to the computer to learn the language by hearing the narration together with the BGM and the effective sound in another second step. In this case, the above mentioned first to fifth steps can be performed in combination.

Furthermore, according to the program information, the learner 1005 can input to the computer a sentence newly written in the language to be learned by the learner, and the teacher 1006 can correct the sentence so that the learner 1005 can hear the corrected sentence in steps 1 to 5 in combination with the other first and second steps.

Using the language learning/teaching materials 1001 in the Ueda Method input to the computer, the teacher 1006 has the learner 1005 read the sentence, the predetermined information, etc.

The above mentioned operations are not shown in the attached drawings, the voice used in the hearing lesson, that is, understanding what is heard, and the reading lesson, that is, understanding what is read etc. is given with the playback speeds changed between the picture and the sound. That is, the voice can maintain the original tune, correctly or to some extent, independent of the playback speed as shown in FIGS. 5 and 6.

There are various method for maintaining the tune of the voice. The technique belongs to the voice speed conversion technique, and the principle is to extend and reduce the length of phoneme by increasing or decreasing the repetition of the waveform of the pitch cycle.

Considering the cost-performance, the method of weighted addition is used for a waveform in a time area. In the method of weighted addition used at a high similarity point on a waveform in a fixed frame, a nice and natural playback sound can be obtained for the voice on which background noise and musical sound are superposed. An LSI having the above mentioned feature such as a speech speed conversion system LSI LC85401E of Sanyo Electric Co., Ltd. etc. has already been marketed.

During the actual operation, if there is a problem with the amount of data on CD-ROM etc. when the language learning/teaching materials 1001 of the Ueda Method are distributed through a network etc., then the speech speed can be converted in a wide range by mounting a speech speed conversion adapter on a personal computer etc. used for playback by transmitting normal speed data through a network, storing the data in the CD-ROM etc.

When there is no problem with the amount of data in the CD-ROM etc. when the language learning/teaching materials 1001 of the Ueda Method are distributed through a network etc., data is stored in the server, the CD-ROM, etc. after being converted into the data at plural speech speeds. Otherwise, on the server side, the data only at a normal speed is stored, a speech speed conversion mechanism is added to the server, and the conversion is performed as necessary.

Using the network shown in FIG. 1, an opinion about a product shown in an advertisement of a company is transmitted to the company through a sentence newly written by the learner 1005 in the language to be learned by the learner, and the narration prepared by the learner 1005. This is another advanced lesson in learning a language although it is not shown in the attached drawings.

With the above mentioned configuration, the present invention can obtain predetermined information for use as language learning materials of the Ueda Method from a company through a network of computers, distribute the learning materials of the Ueda Method to teachers and learners through the network, and effectively teach from a teacher to a learner a language by using the distributed learning materials of the Ueda Method.

What is claimed is:

1. In language learning materials, comprising:
    predetermined information selected from information about our daily life;
    predetermined types of sentences based on sentences described in the information, sentences produced by amending sentences described in the information, or sentences produced according to the information;
    language learning materials for a learner containing predetermined types of sentences represented by segmenting the predetermined types of sentences in word units, representing each word by a picture, a symbol, and/or a photo, and representing a portion of each of the segmented words which cannot be, or can hardly be, represented by the picture, the symbol, and/or the photo in a foreign language to be learned; and
    language teaching materials for a teacher in a foreign language represented by preparing each word, predetermined types of sentence, and sentences in the foreign language to be taught to a learner,
    a system for preparing language materials for teaching a language, comprising the steps of:
    (A) a language learning materials preparing company inputting to a computer said predetermined information selected from the information about our daily life which refers to an advertisement of a company;
    (B) said language learning materials preparing company preparing using the computer said language learning materials for a learner and said language teaching materials for a teacher based on the advertisement;
    (C) distributing said language learning materials for a learner to the learner through a communication network;
    (D) distributing to the teacher said language learning materials for a learner and said language teaching materials for a teacher through a communication network;
    (E) training the teacher using said language learning materials for a learner and said language teaching materials for a teacher;
    (F) inputting and registering the trained teacher and the learner in the computer; and
    (G) said trained teacher teaching a language to the learner through the computer using said language learning materials for a learner and said language teaching materials for a teacher.

2. The system for preparing language materials for teaching a language according to claim 1, wherein said advertisement of a company refers to an advertisement actually shown on television.

3. The system for preparing language materials for teaching a language according to claim 1, wherein said advertisement of a company is to be changed after a predetermined time lapse.

4. The system for preparing language materials for teaching a language according to claim 1, wherein said information refers to instructions of a product and/or company information for which an advertisement of a company is shown on television.

5. The system for preparing language materials for teaching a language according to claim 1, wherein when said advertisement of the company is input to the computer, a charge for the advertisement shown on language learning materials can be collected from the company of the advertisement.

6. The system for preparing language materials for teaching a language according to claim 1, wherein said learning materials for a learner are to be provided for the learner free of charge, and the learner is registered free of charge.

7. A system for preparing language learning materials for teaching a language, wherein according to claim 1 the teacher is charged for training, and the trained teacher is either registered free of charge or charged for registration.

* * * * *